US 8,656,346 B2

(12) United States Patent
Kodi et al.

(10) Patent No.: US 8,656,346 B2
(45) Date of Patent: Feb. 18, 2014

(54) CONVERTING COMMAND UNITS INTO WORKFLOW ACTIVITIES

(75) Inventors: Sai Gopal Kodi, Bothell, WA (US); Edhi Sarwono, Redmond, WA (US); Travis A. Wright, Sammamish, WA (US); James W. Truher, Bellevue, WA (US); Frank Zakrajsek, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 1085 days.

(21) Appl. No.: 12/372,746

(22) Filed: Feb. 18, 2009

(65) Prior Publication Data

US 2010/0211420 A1 Aug. 19, 2010

(51) Int. Cl.
G06F 9/44 (2006.01)

(52) U.S. Cl.
USPC .................. 717/106; 717/107; 717/140

(58) Field of Classification Search
USPC ............. 717/101–178; 705/50–912; 719/313; 715/762, 764, 771; 709/203, 220
See application file for complete search history.

(56) References Cited

U.S. PATENT DOCUMENTS

| 5,634,127 | A | * | 5/1997 | Cloud et al. | 719/313 |
|---|---|---|---|---|---|
| 5,799,297 | A | * | 8/1998 | Goodridge et al. | 1/1 |
| 5,999,911 | A | | 12/1999 | Berg et al. | |
| 6,253,369 | B1 | * | 6/2001 | Cloud et al. | 717/136 |
| 6,339,838 | B1 | | 1/2002 | Weinman, Jr. | |
| 7,243,334 | B1 | * | 7/2007 | Berger et al. | 717/109 |
| 7,451,432 | B2 | | 11/2008 | Shukla et al. | |
| 7,464,366 | B2 | * | 12/2008 | Shukla et al. | 717/100 |
| 7,712,088 | B2 | * | 5/2010 | Sonkin et al. | 717/136 |
| 7,805,324 | B2 | * | 9/2010 | Green et al. | 705/7.27 |
| 2001/0032108 | A1 | * | 10/2001 | Sieron et al. | 705/7 |
| 2003/0037324 | A1 | * | 2/2003 | Kong et al. | 717/173 |
| 2004/0158820 | A1 | * | 8/2004 | Moore et al. | 717/136 |
| 2004/0181774 | A1 | * | 9/2004 | Ohsugi et al. | 717/102 |
| 2005/0149908 | A1 | * | 7/2005 | Klianev | 717/109 |
| 2006/0036568 | A1 | * | 2/2006 | Moore et al. | 707/1 |
| 2006/0074704 | A1 | * | 4/2006 | Shukla et al. | 705/1 |
| 2006/0074730 | A1 | * | 4/2006 | Shukla et al. | 705/8 |
| 2007/0157163 | A1 | * | 7/2007 | Nissen et al. | 717/106 |

(Continued)

OTHER PUBLICATIONS

A Framework for the Design and Reuse of Grid Workflows—Ilkay Altintas, Adam Birnbaum, Kim K. Baldridge, Wibke Sudholt, Mark Miller, Celine Amoreira, Yohann Potier, and Bertram Ludaescher—San Diego Supercomputer Center, University of California at San Diego—Institute of Organic Chemistry, University of Zurich, Switzerland—2005.*

(Continued)

Primary Examiner — Lewis A Bullock, Jr.
Assistant Examiner — Francisco Aponte
(74) Attorney, Agent, or Firm — Brian Haslam; Mike Allen; Micky Minhas

(57) ABSTRACT

One or more available command units can be represented with a computer output device. The available command units can be command units from one or more snapins, such as one or more snapins that include command units to be run with a shell application. User input can be received from an input device, the user input selecting one or more selected command units of the available command units. In response to the user input, source code can be automatically generated from the one or more command units, and the source code can be automatically compiled to generate one or more workflow activities.

20 Claims, 6 Drawing Sheets

(56) References Cited

U.S. PATENT DOCUMENTS

| | | | | |
|---|---|---|---|---|
| 2007/0208587 A1* | 9/2007 | Sitaraman | ......................... | 705/1 |
| 2008/0276229 A1* | 11/2008 | Hawkins et al. | .............. | 717/136 |
| 2009/0006154 A1* | 1/2009 | Hao et al. | ......................... | 705/7 |
| 2009/0006997 A1* | 1/2009 | Jiang et al. | ................... | 715/771 |
| 2009/0031280 A1* | 1/2009 | Koehler | ........................ | 717/104 |
| 2009/0070121 A1* | 3/2009 | Leonelli et al. | .................. | 705/1 |
| 2009/0125878 A1* | 5/2009 | Cullum et al. | ................. | 717/106 |
| 2010/0106547 A1* | 4/2010 | Adi et al. | ........................... | 705/8 |
| 2011/0154231 A1* | 6/2011 | Cherdron et al. | ............. | 715/764 |

OTHER PUBLICATIONS

"Jamescon's WebLog", retrieved at <<http://blogs.msdn.com/jamescon/>>, Feb. 14, 2008, pp. 5.

Woensdag, "VMware PowerShell—Artikelen Van Nov. 2007", retrieved at <<http://www.ntpro.nl/blog/archives/2007/11/C10.html>> Nov. 28, 2007, pp. 4.

"EmpowerID and Microsoft PowerShell", retrieved at <<http://www.thedotnetfactory.com/microsoft_powershell.php>>, Dec. 17, 2008, pp. 2.

"What a WF4.0 Workflow Looks Like in Code", retrieved at <<http://geekswithblogs.net/cloud9/archive/2008/11/09/what-a-wf4.0-workflow-looks-like-in-code.aspx>>, Dec. 17, 2008, pp. 2.

"Windows PowerShell (PS) User Guide", retrieved at <<http://www.trefreds.net/pcug.htm>>, Microsoft, pp. 1-249.

"Risman Adnan MASM::C::C++::C#::Web Adventurer", retrieved at <<http://geeks.netindonesia.net/blogs/risman/>>, Oct. 30, 2008, pp. 39.

"Windows PowerShell (PS) User Guide", retrieved at <<http://www.trefreds.net/pcug.htm>>, Copyright Notice Date: 2006, pp. 1-249, Microsoft.

"Shell", retrieved from <<http://www.webopedia.com/TERM/S/shell.html>>, Retrieved on Feb. 6, 2013, pp. 2.

* cited by examiner

CONVERTING COMMAND UNITS INTO WORKFLOW ACTIVITIES

BACKGROUND

The complexity of computer management systems and management-related processes has reached new heights, making it difficult for information technology (IT) professionals and administrators to achieve the process maturity that will result in improved IT service levels, increased responsiveness to the needs of businesses, and increased IT efficiency. Organizations are outgrowing the basic job scheduling capabilities of disparate software products.

Workflow creation platforms and workflow engines have been provided to address this need. A workflow creation platform provides a framework for creating workflows, including describing workflows and their behavior. A workflow engine executes workflows. For example, a workflow engine can include services for scheduling or triggering workflows, capturing the execution history and output from workflows, and managing the lifetime of workflows. There may be multiple different workflow engines that can facilitate the execution of workflows created or edited with a particular workflow creation platform. A workflow engine and a workflow creation platform may be incorporated in a single product or application, or they may be one or more separate products or applications.

A workflow defines relationships between units of work, which are referred to herein as "activities." For example, activities can be human activities (which are performed primarily by humans) or system activities (which are performed primarily by computer systems). A single workflow may include only human activities, only system activities, or both human and system activities. Often, activities can be reused in multiple workflows. Information technology professionals who create workflows typically use a library of such activities when creating workflows.

Using current tools in the industry, development of workflow activities is often a complicated task, and it can take a significant amount of time. Because of the complexity, developing workflow activities is typically done by developers, who often must manually enter the source code for activities.

Command shell applications, such as command line shells and graphical user interface (GUI) shells, are sometimes used to allow the entry of commands and to invoke corresponding command units. An application may provide a command unit snapin (a collection of one or more command units) to automate administrative tasks. Such a snapin can include a set of one or more command units to be invoked by a shell application. Entering command shell commands is typically not as complex as developing workflow activities. Thus, developers are typically not needed to enter command shell commands; rather, IT professionals can typically enter commands into command shell applications to invoke corresponding command units.

SUMMARY

It would be useful to have a simple way for users, such as information technology professionals, to transform shell command units into workflow activities. The described embodiments can fill this need.

In one embodiment, one or more available command units that can be executed through a shell application can be represented with an output device. User input can be received from an input device, the user input selecting one or more selected command units of the available command units. In response to the user input, source code can be automatically generated from the one or more command units, and the source code can be automatically compiled to generate one or more workflow activities.

In another embodiment, one or more available snapins can be represented, and a user input selecting one or more selected snapins of the one or more available snapins can be received. One or more command units from the one or more selected snapins can be represented, and user input selecting one or more selected command units of the one or more represented command units can be received. In addition, one or more workflow activities can be generated from the one or more selected command units.

In yet another embodiment, an indication of one or more selected command units to be converted to one or more workflow activities can be received. One or more workflow activities can be generated from the one or more selected command units. The one or more workflow activities can be configured according to a workflow creation platform. Additionally, the one or more workflow activities can be configured to be executed by any of a plurality of different workflow engines that support the workflow creation platform.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
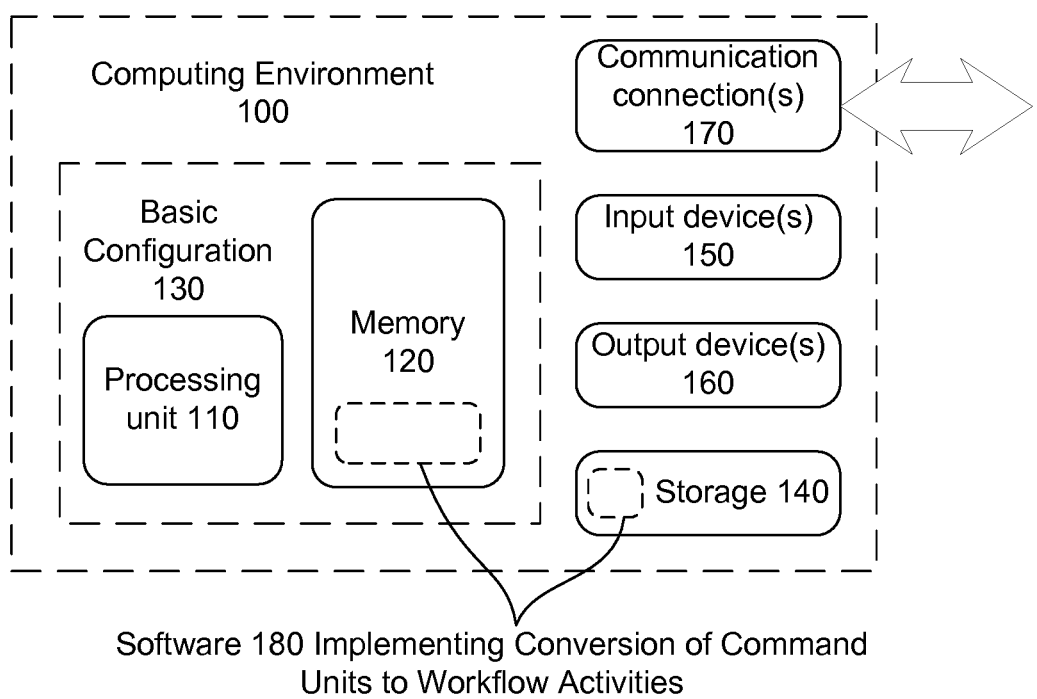
FIG. 1 is a block diagram of a suitable computing environment in which one or more of the described embodiments may be implemented.

Described embodiments are directed to techniques and tools for improved creation of workflow activities. Such improvements may result from the use of various techniques and tools separately or in combination.

Such techniques and tools may include converting a shell command unit into a workflow activity, or stated another way, using a shell command unit to generate a corresponding workflow activity. The described embodiments provide a way to do this automatically and/or to do it in a way that allows the activity to be used by any of multiple workflow engines that support a particular workflow creation platform.

Often, a converted activity can be used by any workflow engine that supports a particular workflow creation platform. One or more command units may be represented to a user, and the user may be able to select one of the represented command units. For example, multiple command unit snapins may be represented to the user, and if the user selects one or more of the snapins, then the command units in the selected snapin(s) can be represented to the user. The user can then select one or more command units from the snapin(s) to be converted to workflow activities. In response to the selection, the selected command units can be automatically converted to workflow activities. This conversion can include mapping properties from the command units onto properties for workflow activities to generate source code for the activities using those mapped properties, and compiling the source code into workflow activities. Those converted workflow activities can be used similarly to other workflow activities—users can include them in workflows and they can be executed by workflow engines as part of those workflows without modifying the workflow engine or supporting code. However, each converted workflow can include logic to invoke the original command unit, so that when a converted workflow activity is executed, the corresponding original command is invoked and executed.

It has been known to convert a shell command unit into a workflow activity. However, it is believed that some known methods for such conversions only automatically create some source code to be used in the conversion, rather than automatically creating the activities themselves. Accordingly, it is believed that a user typically must enter some source code manually before using a compiler to compile the source code into an activity. In addition, it is believed that some such methods create activities that can only be used with a specific workflow engine; they cannot be used with other workflow engines, even if those engines are compatible with the same workflow creation platform as the specific engine.

In contrast to such prior techniques, the present tools and techniques can provide one or more advantages that make conversion of command units to workflow activities more user-friendly. For example, the tools and techniques described herein can automatically create workflow activities that can be executed by multiple different workflow engines, such as by any workflow engine that is compatible with a particular workflow creation platform.

One or more substantial benefits can be realized from the workload activity creation tools and techniques described herein. For example, workflow activities can be created by users who do not have the knowledge possessed by a typical software developer. As another example, workflow activities can be created automatically with little required time or effort. As yet another example, workflow activities can be created from command units using a workflow creation platform, and the workflow activities can be used with any workflow engine that supports that workflow creation platform.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Techniques described herein with reference to flowcharts may be used with one or more of the systems described herein and/or with one or more other systems. Moreover, for the sake of simplicity, flowcharts may not show the various ways in which particular techniques can be used in conjunction with other techniques.

I. Exemplary Computing Environment

FIG. 1 illustrates a generalized example of a suitable computing environment (100) in which one or more of the described embodiments may be implemented. For example, one or more such computing environments can be used to convert command units to workflow activities. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing the conversion of command units into workflow activities.

Although the various blocks of FIG. 1 and other figures described below are shown with lines for the sake of clarity, in reality, delineating various components is not so clear and, metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media. Computer-readable media are any available media that can be accessed within a computing environment. By way of example, and not limitation, with the computing environment (100), computer-readable media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "select," "represent," "generate," "convert," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. Workflow Activity Creation Environment

Figure 2:
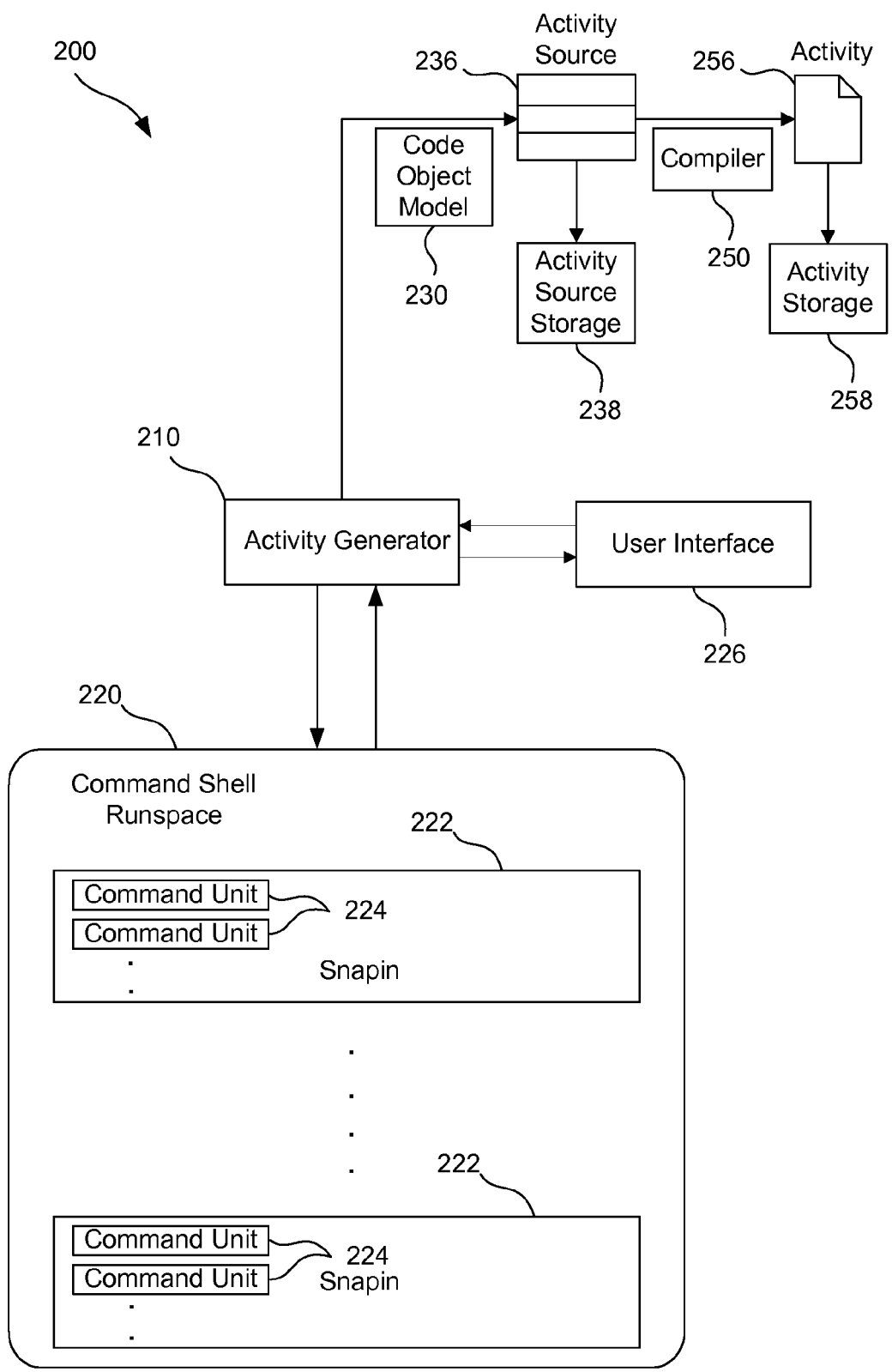
FIG. 2 is block diagram of a computing environment for generating workflow activities from command units.

Referring to FIG. 2, a workflow activity generation computing environment (200) will be described. The components of the computing environment (200) may be incorporated into, be run by, and/or interact with other computing components, such as the components of the computing environment (100) discussed above.

A. Activity Generator

The computing environment (200) can include an activity generator (210), which can manage the conversion of one or more command units (such as cmdlets from the Windows PowerShell™ command line interface) into one or more corresponding workflow activities (such as Windows Workflow Foundation workflow activities).

B. Command Shell Runspace

The environment (200) can also include a command shell runspace (220), such as a runspace of the Windows PowerShell™ command line interface. The command shell runspace (220) can access one or more available command unit snapins (222) registered with the computing environment (200) (such as being registered on a local machine). Each snapin (222) includes one or more command units (224) (such as one or more cmdlets for the Windows PowerShell™ command line interface). This is illustrated in FIG. 2 with the command units (224) being within the snapins (222), and the snapins (222) being within the command shell runspace (220).

As indicated by the two arrows between the activity generator (210) and the command shell runspace (220), the activity generator (210) can interact with the command shell runspace (220) to request and receive information about the snapins (222) and the command units (224). The activity generator (210) can use this information in generating activities from the command units (224), as discussed below. For example, the activity generator (210) can use this information to determine what information needs to be obtained from a user at workflow design time to allow the activity to run properly as part of a workflow. The exchange of information between the activity generator (210) and the command shell runspace (220) can be done using one or more standard programmatic interfaces.

The activity generator (210) can make a request for the command shell runspace (220) to return the names of all the snapins (222) that are registered and available to the command shell runspace (220). In addition, for each snapin (222), the activity generator can make a request for the command shell runspace (220) to return names and other properties of the command units (224) in one or more of the snapins (222).

C. User Interface

Pertinent information about the snapins (222) and command units (224) can be requested all at once, or pertinent information can be requested from the command shell runspace (220) as it is needed, as determined by input received from a user interface (226) (as indicated by the arrow from the user interface (226) to the activity generator (210)). The activity generator (210) can also send information to the user interface (226) to be displayed to a user (as indicated by the arrow from the activity generator (210) to the user interface (226)). The user interface (226) can include one or more user output devices and one or more user input devices, such as those described above with reference to FIG. 1.

As an example, in response to user input from the user interface (226) invoking the activity generator (210), the activity generator (210) can request and receive from the command shell runspace (220) the names of the available snapin(s) (222). Those names can then be sent by the activity generator (210) to the user interface (226). In response to user input from the user interface (226) selecting one or more of the snapins (222), the activity generator (210) can request and receive from the command shell runspace (220) the names of the command units (224) in the selected snapins (222). Additionally, in response to user input from the user interface (226) selecting one or more of the command units (224) to be converted to corresponding workflow activities, the activity generator (210) can request and receive from the command shell runspace (220) additional information about the selected command unit(s) (224).

D. Information Collected About Command Units

The following are examples of types of information or properties that may be collected by the activity generator (210) and the command shell runspace (220) for each command unit (224) to be converted: the name of the command unit (224), a description of the command unit (224), help context for the command unit (224), general parameters exposed by the command unit (224), individual parameters exposed by the command unit (224), and the types of the individual parameters exposed by the command unit (224).

As an example, for cmdlets for the Windows Powershell™ command line interface that potentially have multiple parameter sets for each cmdlet, a cmdlet name (Name) can be collected for each cmdlet, and a name (Name) and default value (IsDefault) of each parameter set can be collected. In addition, information about each parameter in each parameter set can be collected. The information about each parameter can include a name of the parameter (ParameterName), a parameter type (ParameterType), a parameter help message (HelpMessage), an indication of whether the parameter is mandatory (IsMandatory), and an expected position of the cmdlet in a command line for executing the cmdlet (Position).

This parameter information can be useful for various purposes. For example, a parameter name can be useful to convey the name of the parameter to a user designing a workflow using a corresponding converted workflow activity so that the user can input appropriate information for the parameter. A parameter name can also be included in a call made to the command line interface (such as including the name immediately preceding the value for the parameter) to invoke an original cmdlet when a corresponding converted activity is executed. The position of a parameter can be useful so that a name and value for that parameter can be included in an appropriate place in a call made to the command line interface to invoke the cmdlet when executing a corresponding converted activity. Similarly, a parameter help message can be useful in conveying helpful information to a user designing or running a workflow that includes a workflow activity converted from the cmdlet. The parameter type can be useful to ensure that information entered for the parameter is of a correct type, such as when a user is entering parameter values when designing a workflow with a corresponding converted workflow activity. An indication of whether a parameter is mandatory can be useful to force a user to enter values for mandatory parameters, or to invoke error messages if a user fails to do so. Of course, different types of information could be collected in other implementations.

E. The Code Object Model and the Activity Source Component

Referring still to FIG. 2, the activity generator (210) can use a code object model (230), such the code object model referred to as the Code Document Object Model (also known as the Code DOM) available from Microsoft Corporation, to map the properties (typically metadata, such as the kinds of metadata discussed above) of the command units (224) onto properties for workflow activities. The activity generator (210) can also use the code object model (230) to generate source code, producing an activity source component (236) in a source language that can be compiled by a standard compiler. For example, the activity source component (236) can be a Microsoft .NET activity class in the C# source language. The activity source component (236) can be stored in an activity source storage area (238), such as a storage area on a filesystem.

Command units (224) can sometimes return objects having particular types, such as complex objects. Such objects may be serialized (such as being serialized by a module in the command shell runspace (220)) and returned to workflow activities as serialized strings, rather than the objects' original types. The activity generator (210) can generate source code to be included in the activity source component (236) to reconstruct such serialized strings back to their original object type. That source code can be compiled into a helper utility in the activity. The helper utility can read the serialized string (such as a serialized XML string) and reconstruct the object (such as reconstructing a Microsoft .NET complex object using .NET reflection). In some situations, the reconstructed object may not include all the information from the original object, such as if all the information in the original object was not serialized.

If the command units (224) are cmdlets for the Windows Powershell™ command line interface, and the activity source component (236) is a Microsoft .NET activity class in C# language, the cmdlet name can be used as the activity class name, and required namespaces can be included appropriately. If the cmdlet has multiple parameter sets, then an enumeration can be created, with the name of each parameter set being a member of the enumeration. In addition, a mapping can be maintained between each parameter set and the individual parameters within that set. Each parameter can be exposed as a public property of an appropriate type (which can be taken from the ParameterType value in the cmdlet), and can be named appropriately, such as by prefixing an underscore to the name of the cmdlet parameter. The name (ParameterName) and help message (HelpMessage) properties of each cmdlet parameter can be set as the DisplayName and Description attributes of the public properties in the activity class. Other parameter-specific cmdlet properties, such as IsMandatory and Position can be set as custom attributes of the public properties in the activity class. Appropriate overridden methods of collecting and specifying information, such as user-specified information, can also be created as part of the activity class.

An error handler routine can also be generated as part of the activity class. Such a routine can help to validate user input, the sequence of parameters, and the mapping of parameter sets and parameters. Using this routine, error validation can occur during workflow design. For example, if a user does not specify a mandatory parameter when including a converted workflow activity in a workflow, the user could get an error message. As another example, there can be a check to determine whether parameters specified by a user are of an appropriate type (integer, etc.), and appropriate error handling routines can be followed, based on those determinations. Alternatively, different error handling routines could be implemented, or error handling routines could be omitted.

In addition to the mapped properties of the corresponding command unit (224), each activity source component (236) can include logic to execute the corresponding command unit. For example, the activity source component (236) can include logic for initiating (if necessary) and calling the command shell runspace (220) to run the corresponding command unit (224). This can include passing an appropriate command line to the runspace, including a name and appropriate parameters for a command unit (224) corresponding to a converted workflow activity being invoked as part of a workflow.

F. The Compiler and the Workflow Activity

Referring still to FIG. 2, a compiler (250) can compile each activity source component (236) into a workflow activity (256), such as a system workflow activity in a format that can be used by a standard workflow creation platform to create a workflow that includes the workflow activity (256). For example, activity source components (236) can be included in a larger Microsoft Visual Studio project, which can be compiled using Microsoft Visual Studio. As another example, Microsoft's Code DOM could be used to compile workflow activities (256) into Microsoft .NET assemblies.

The workflow activity (256) can be stored in an activity storage area (258), such as an appropriate storage area in a filesystem where it is available to an appropriate workflow creation platform. The workflow activity (256) can then be included in workflows using an appropriate workflow creation platform, such as Microsoft's Visual Studio software or a management pack authoring console that may be included in future releases of Microsoft's System Center Service Manager software. Those workflows can be executed by standard workflow engines that support the workflow creation platform.

The workflow activity (256) can include logic for initiating (if necessary) and calling the command shell runspace (220) to run the corresponding command unit (224) when the activity is initiated as part of a workflow. Thus, the activity (256) can be thought of as a workflow activity wrapper for the corresponding command unit (224), which allows a standard workflow engine to run the workflow activity (256) and thereby invoke the corresponding command unit (224) as part of the workflow. The activity (256) can also include logic for receiving information that is produced by the execution of the corresponding command unit (224). This information can be dealt with appropriately in a normal manner, such as storing it and/or displaying it to a user at the conclusion of the execution of the activity (256), or the conclusion of the execution of the workflow.

III. Command and Workflow Techniques

A. Technique For Converting Command Units for Use in Workflows

Figure 3:
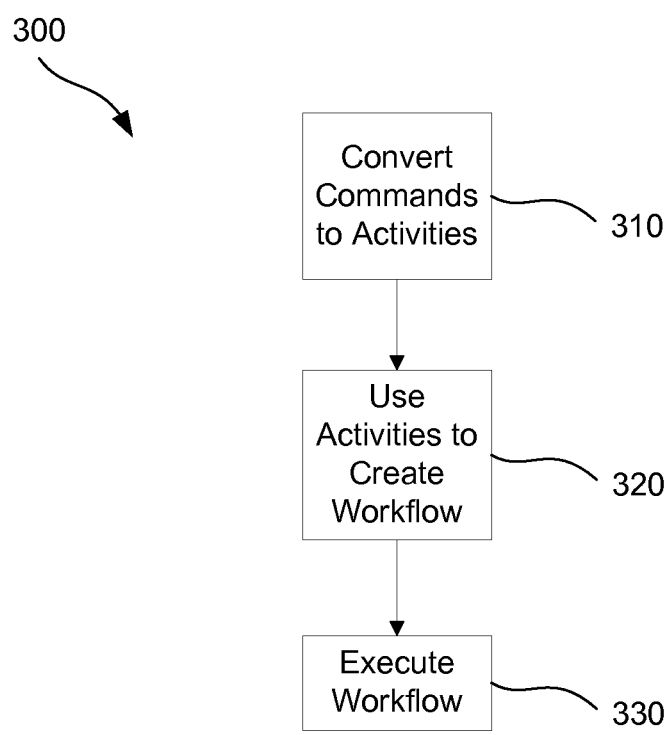
FIG. 3 is a flow diagram illustrating a technique for generating and using workflow activities.

Referring to FIG. 3, a general technique (300) for converting command units to workflow activities and using them in workflows will be described. The technique illustrated in FIG. 3 and the techniques described below with reference to FIG. 4 may be carried out using computing environments such as the ones described above with reference to FIGS. 1 and 2, or using one or more other computing environments. The technique (300) can include converting (310) command units to workflow activities, such as .NET workflow activity assemblies or some other kind of workflow activity assemblies.

The converted activities can be used (320) to create workflows by declaring workflows that include the converted activities. The workflows can also include other activities, including human and/or system activities. The use of the activities in creating workflows can be done in a typical manner with a standard workflow creation platform, such as Microsoft's Visual Studio software or a management pack authoring console that may be included in future releases of Microsoft's System Center Service Manager or some other workflow creation platform, so that the workflows using those activities can be executed (330) by any of multiple standard workflow engines that support the workflow creation platform. Indeed, the workflows can typically be executed (330) by any such standard workflow engine that supports the corresponding workflow creation platform.

During workflow execution (330), a converted workflow activity can be invoked in a typical way, such as at a specified time or upon the occurrence of a specified event in the course of the workflow. When the workflow activity is invoked, the workflow engine can use logic in the converted workflow activity to call a shell application for the corresponding command unit. This call can instruct the shell application to initiate, if necessary, and to run the corresponding command unit according to specified parameters. For example, this can be done with standard programmatic interfaces between the activity and the shell application, and parameters can be passed to the shell application with the appropriate context and in the appropriate positions for the shell application. This context and these positions can be specified in the converted activity (e.g., with the mapped versions of the parameter position property and other properties for parameters for the command unit). The shell application can return any results (e.g., data and/or error messages) to the activity. For returned serialized strings, the activity may reconstruct the original object types from the serialized strings, as discussed above. The activity can in turn pass the results (including reconstructed objects) on to the workflow engine running the activity using standard programmatic interfaces. The workflow engine can then deal with the results appropriately, such as by displaying them when the workflow including the activity finishes running or using the results as input to conditional logic functions to determine the next activity in a workflow.

B. Technique for Converting Command Units to Workflow Activities

Figure 4:
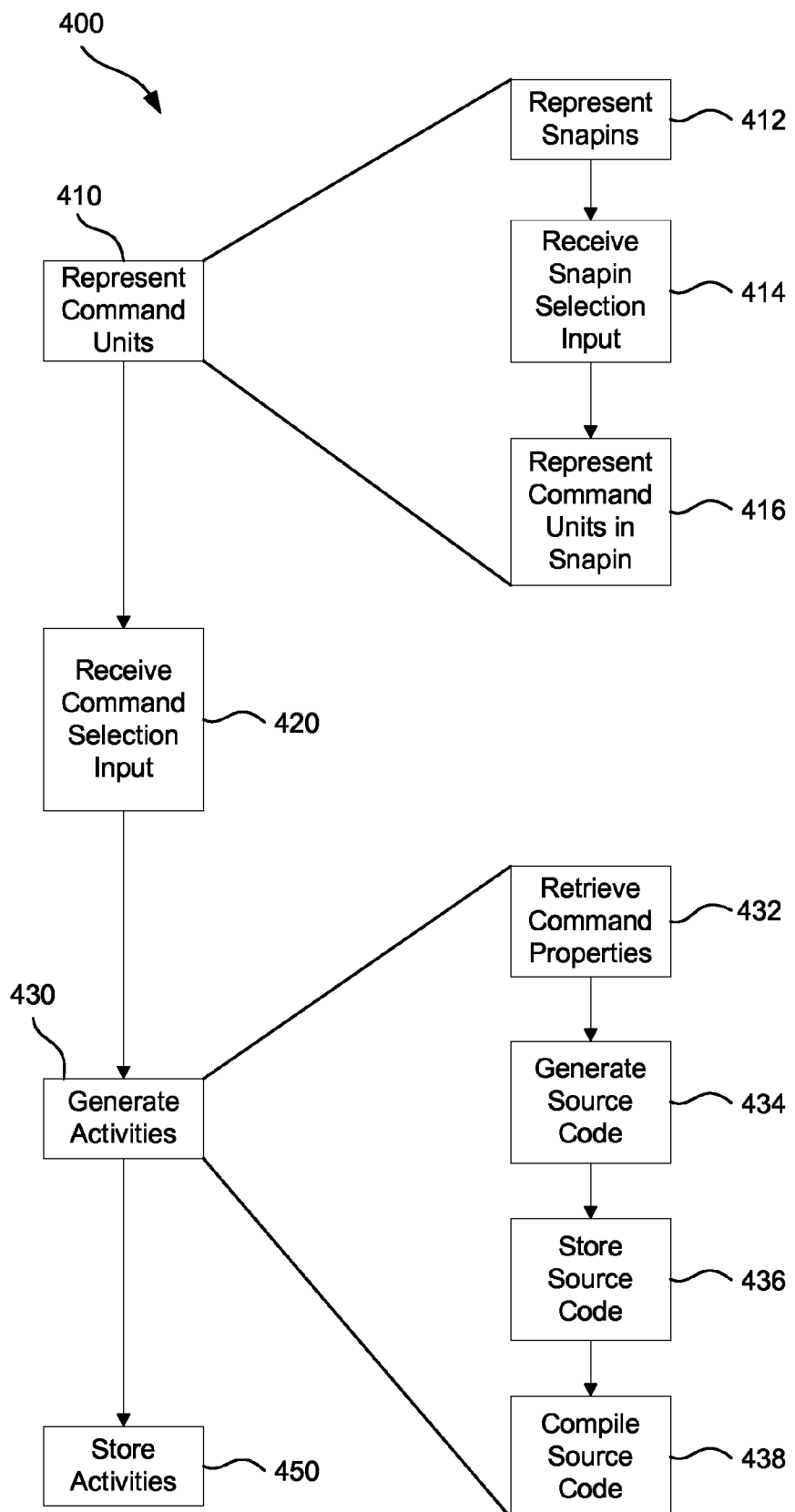
FIG. 4 is a flow diagram illustrating a technique for converting command units to workflow activities.

Referring now to FIG. 4, a technique (400) for converting command units to workflow activities will be described. Command units can be represented (410) to a user. There are many ways that this could be done using various user interface output devices. However, representing (410) the command units can include representing (412) one or more available command unit snapins that each include one or more command units. For example, available snapins can be listed on a display area of a computer display, as described below with reference to FIG. 5. A user input that selects one or more of the snapins can be received (414), such as from a user input device. One or more command units in the selected snapin(s) can then be represented (416).

A user input that selects one or more of the represented command units can be received (420), such as from a user input device, and one or more activities can be generated or converted (430) from the command unit(s). Generating (430) one or more activities can be done in different ways. However, it can include retrieving (432) properties of selected command units. This could be done in a single call, in sequence as multiple commands are selected, or in some other manner. As discussed above, the retrieved properties can include those that are desired for collecting needed information, such as properties that define parameters to be received as user input when a workflow with the resulting activity is designed. The retrieved properties can also include those that are desired for executing the resulting workflow activity and invoking a corresponding command unit when the activity is executed.

The retrieved properties can be used to generate (434) source code for workflow activities. Generating (434) the source code can include mapping the retrieved properties to properties in a source language, and generating source code with appropriate context. For example, this can be done using a code document object model, such as the Code DOM available from Microsoft Corporation. The generated source code, which can be an activity class such as a Microsoft .NET activity class in C# code, can be stored (436) in non-volatile storage, such as in a filesystem. Alternatively, the source code could remain in volatile memory, such as volatile RAM, and not be stored in non-volatile storage. The source code can be compiled (438) to form a workflow activity, such as an activity based on Windows Workflow Foundation. For example, compiling (438) can be done with a standard compiler that can compile C# code.

The resulting converted workflow activity or activities can be stored (450), and can be used in designing workflows that use the activities, such as by using a standard workflow creation platform. Those activities can then be run with a standard workflow engine that supports the platform, as discussed above.

C. Snapin Display

Figure 5:
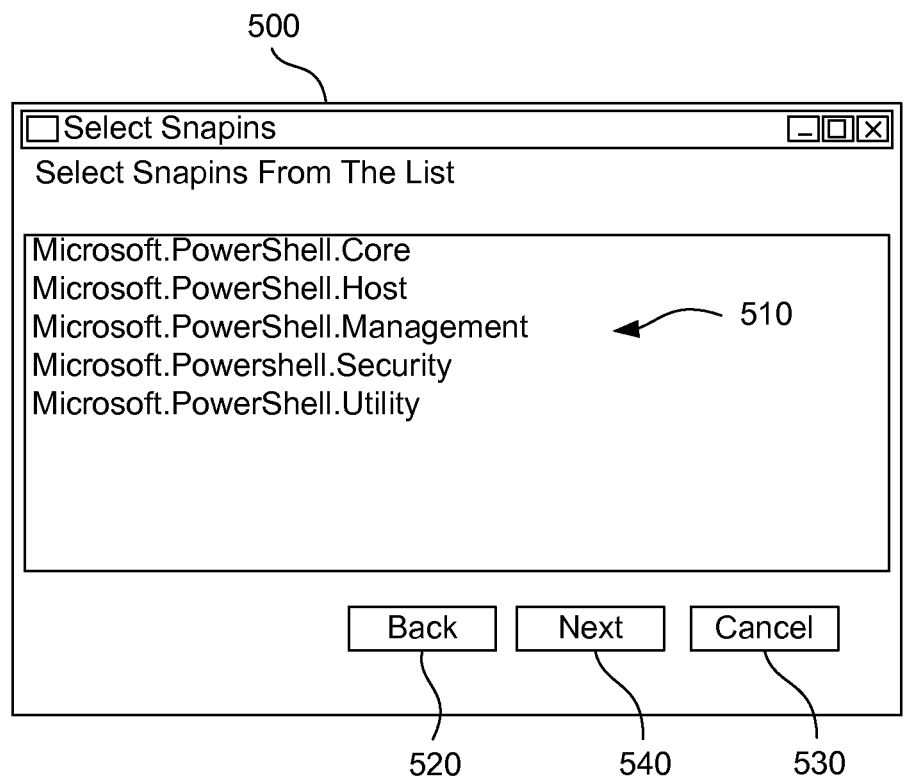
FIG. 5 is an illustration of a display area for displaying a list of available snapins.
Figure 6:
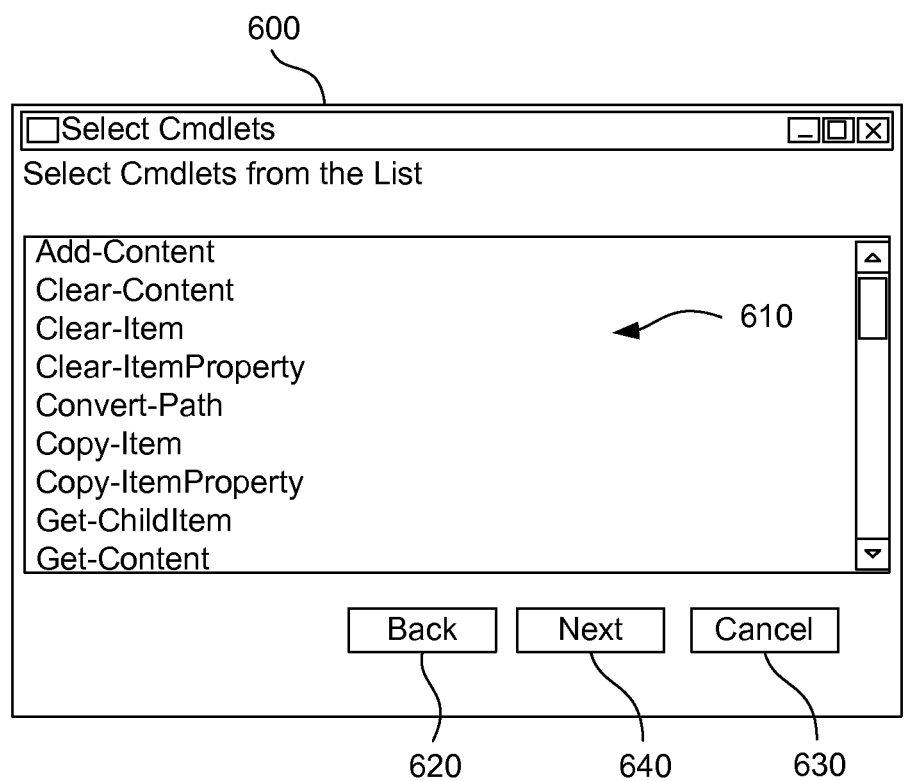
FIG. 6 is an illustration of a display area for displaying a list of available command units.

Referring to FIG. 5, a snapin display area (500), such as a display area of a computer display, displays a list (510) representing available snapins that can be selected, as discussed above with respect to representing (412) snapins in FIG. 4. The selection of snapins could be done in any conventional manner, such as by using a keyboard or a pointing device to move a cursor over the list and selecting one or more desired snapins by depressing a button on a keyboard or pointing device. The display area (500) can include buttons, which can be target areas of a display, where a user can indicate a selection by hovering a pointer over the target area and making an indication such as a mouse click. Selection of a back button (520) can result in the display of a previous display area, such as a display area that allows a user to make a selection to invoke the snapin display area (500). Selection of a cancel button (530) can cancel the operation and close the snapin display area (500). After selecting one or more snapins from the snapin list (510), a user can select a next button (540) to display a command unit display area (600) illustrated in FIG. 6.

D. Command Unit Display

The command unit display area (600) can display a list (610) representing available command units in the selected snapins, such as the representing (416) discussed above with reference to FIG. 4. A user can select one or more command units from the list (610) in the same manner as selecting the snapins from the snapin list (510) illustrated in FIG. 5. The command unit display area (600) can also include a back button (620), which can be selected to return to the snapin display area (500) of FIG. 5. In addition, the command unit display area (600) can include a cancel button (630), which can be selected to cancel the selection of command units. Selection of a next button (640) on the command unit display area (600) can result in a computing environment automatically generating workflow activities from the selected command units, as discussed above. Alternatively, some additional user input could be requested. For example, the selected command unit(s) could be converted to source code activity class(es) in response to selection of the next button (640), and an additional user input could prompt the computing environment to compile the source code activity class(es) into workflow activities.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method, comprising:
an activity generator representing with an output device one or more available command units that can be executed through a command shell application, the one or more command units being executable through the command shell application by the command shell application allowing a command corresponding to each of the one or more command units to be entered by user input into the command shell application and by the command shell application responding to the user-entered command by invoking the command unit corresponding to the user-entered command;
the activity generator receiving user input from an input device, the user input selecting one or more selected command units of the available command units; and
in response to the user input:
the activity generator automatically generating source code from the one or more selected command units, generating the source code comprising mapping properties of the one or more selected command units onto workflow activity properties, the mapping comprising using a code object model to map properties of the one or more selected command units onto workflow activity properties; and
automatically compiling the source code to generate one or more workflow activities, each of which is configured to be executed by a workflow engine, the workflow engine, the command shell application, and the activity generator being different from each other.

2. The method of claim 1, wherein each of the one or more workflow activities is configured to facilitate execution of a corresponding command unit through the command shell application as part of the workflow engine executing the workflow activity, each of the one or more workflow activities having been generated from its corresponding command unit.

3. The method of claim 1, wherein the one or more workflow activities are configured to be run by any of a plurality of different workflow engines.

4. The method of claim 3, wherein the workflow activities are configured according to a workflow creation platform, and the workflow activities are configured to be executed by any workflow engine that supports workflows created with the workflow creation platform.

5. The method of claim 1, further comprising storing the one or more workflow activities in computer storage.

6. The method of claim 1, wherein the code object model is a code document object model.

7. The method of claim 1, further comprising using one or more of the generated workflow activities to form one or more workflows and executing the one or more-workflows.

8. The method of claim 1, wherein at least one of the one or more workflow activities is configured such that execution of the at least one of the one or more workflow activities produces a reconstructed object from a serialized string, the reconstructed object being an object type that is the same as an object type of an original object from which the serialized string was produced.

9. The method of claim 1, wherein representing the one or more available command units comprises displaying one or more representations of one or more available snapins.

10. The method of claim 9, wherein representing the one or more available command units further comprises:
receiving a user input selecting one or more selected snapins of the one or more available snapins; and in response to the user input selecting one or more selected snapins of the one or more available snapins, displaying one or more command units from the one or more selected snapins.

11. Computer-readable memory containing one or more programs, the one or more programs comprising instructions that are executable by a computer system to perform acts comprising:
an activity generator receiving an indication of one or more selected command units to be converted to one or more workflow activities, the one or more selected command units being command units that can be executed by allowing a command corresponding to each of the one or more command units to be entered by user input into a command shell application and by the command shell application responding to the user-entered command by invoking the command unit corresponding to the user-entered command; and in response to receiving the indication:
the activity generator automatically generating source code from the one or more selected command units, generating the source code comprising mapping properties of the one or more selected command units onto workflow activity properties, the mapping comprising using a code object model to map properties of the one or more selected command units onto workflow activity properties; and automatically compiling the source code to generate one or more workflow activities, each of which is configured to be executed by a workflow engine; the workflow engine, the command shell application, and the activity generator being different from each other.

12. The computer-readable memory of claim 11, wherein the acts further comprise displaying on a computer display one or more representations of one or more available command units that can be executed through a command shell application, wherein the one or more available command units include the one or more selected command units.

13. The computer-readable memory of claim 11, wherein receiving an indication of one or more selected command units comprises receiving user input from a user input device.

14. The computer-readable memory of claim 11, wherein generating one or more workflow activities comprises automatically generating one or more workflow activities.

15. A computer system comprising:
at least one processor; and
memory comprising instructions stored thereon that when executed by at least one processor cause at least one processor to perform acts comprising:
representing one or more command units the one or more command units each being executable through a command shell application, and the one or more command units being executable through the command shell application by the command shell application allowing a command corresponding to each of the one or more command units to be entered by user input into the command shell application and by the command shell application responding to the user-entered command by invoking the command unit corresponding to the user-entered command;

an activity generator receiving user input selecting one or more selected command units of the one or more represented command units; and generating one or more workflow activities from the one or more selected command units, the one or more workflow activities each being configured to be executed by a workflow engine, the workflow engine, the command shell application, and an activity generator being different from each other, and the generation of the one or more workflow activities comprising:
the activity generator generating source code from the one or more command units, generating source code including mapping properties of the one or more selected command units onto workflow activity properties, the mapping comprising using a code object model to map properties of the one or more selected command units onto workflow activity properties; and
compiling the source code.

16. The system of claim 15, wherein generating the one or more workflow activities comprises automatically generating the one or more workflow activities in response to the user input selecting the one or more selected command units.

17. The system of claim 15, wherein the workflow activities are configured to be executed by any of a plurality of different workflow engines.

18. The system of claim 17, wherein the workflow activities are configured according to a workflow creation platform, and the workflow activities are configured to be executed by any workflow engine that supports the workflow creation platform.

19. The computer-readable memory of claim 11, wherein the one or more workflow activities are configured according to a workflow creation platform, wherein the one or more workflow activities are configured to be executed by any of a plurality of different workflow engines that support the workflow creation platform, and wherein the workflow engines, the command shell application, and the activity generator are different from each other.

20. The system of claim 15, further comprising:
representing one or more available snapins; and receiving a user input selecting one or more selected snapins of the one or more available snapins, wherein the one or more represented command units are from the one or more selected snapins.

* * * * *